United States Patent
Kimura

(10) Patent No.: US 10,414,187 B2
(45) Date of Patent: Sep. 17, 2019

(54) METHOD OF CREATING THREE-DIMENSIONALLY SHAPED OBJECT, PRINT DATA CREATION APPARATUS, AND COMPUTER-READABLE STORAGE MEDIUM

(71) Applicant: CASIO COMPUTER CO., LTD., Tokyo (JP)

(72) Inventor: Satoshi Kimura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 13 days.

(21) Appl. No.: 15/631,976

(22) Filed: Jun. 23, 2017

(65) Prior Publication Data

US 2018/0056693 A1 Mar. 1, 2018

(30) Foreign Application Priority Data

Aug. 25, 2016 (JP) ................................ 2016-164214

(51) Int. Cl.
  *B41M 5/395* (2006.01)
  *B29C 64/386* (2017.01)
  (Continued)

(52) U.S. Cl.
  CPC ......... *B41M 5/395* (2013.01); *B29C 35/0272* (2013.01); *B29C 35/0805* (2013.01);
  (Continued)

(58) Field of Classification Search
  CPC combination set(s) only.
  See application file for complete search history.

(56) References Cited

U.S. PATENT DOCUMENTS

| | | | |
|---|---|---|---|
| 2013/0229478 A1* | 9/2013 | Horiuchi | B41M 7/009 347/188 |
| 2013/0280498 A1 | 10/2013 | Horiuchi et al. | |
| 2013/0309650 A1* | 11/2013 | Carney | B43L 1/00 434/414 |

FOREIGN PATENT DOCUMENTS

| | | |
|---|---|---|
| JP | S54-027821 A | 3/1979 |
| JP | H03-112360 U | 11/1991 |

(Continued)

OTHER PUBLICATIONS

Burtonwood, https://www.thingiverse.com/thing:110411, 2013 (Year: 2013).*

(Continued)

*Primary Examiner* — Brian W Wathen
*Assistant Examiner* — Hung H Dang
(74) *Attorney, Agent, or Firm* — Chen Yoshimura LLP

(57) ABSTRACT

A method of creating a three-dimensionally shaped object, the method having: a creation step for creating image data for printing an image on a thermally expandable sheet; a printing step for printing an image on the thermally expandable sheet on the basis of the image data created in the creation step; and a protuberation step for partially protuberating the thermally expandable sheet via thermal expansion by irradiating light toward the image printed on the thermally expandable sheet in the printing step. The creation step creates image data such that a grayscale of an image is set so that a fastening portion that fastens a thermally expandable sheet is either intermittently or continuously surrounded by a region where a protuberation height resulting from the thermal expansion is high.

17 Claims, 8 Drawing Sheets

(51) Int. Cl.
*B41M 5/42* (2006.01)
*C09D 11/101* (2014.01)
*B29C 35/02* (2006.01)
*B29C 35/08* (2006.01)
*B29C 59/18* (2006.01)
*B41M 5/41* (2006.01)
*B41J 3/407* (2006.01)
*B29C 37/00* (2006.01)
*B29K 105/04* (2006.01)
*B41M 7/00* (2006.01)

(52) U.S. Cl.
CPC ............ *B29C 59/18* (2013.01); *B29C 64/386* (2017.08); *B41J 3/4073* (2013.01); *B41M 5/41* (2013.01); *B41M 5/426* (2013.01); *C09D 11/101* (2013.01); *B29C 37/005* (2013.01); *B29C 2035/0822* (2013.01); *B29K 2105/04* (2013.01); *B41M 7/009* (2013.01)

(56) References Cited

FOREIGN PATENT DOCUMENTS

| | | |
|---|---|---|
| JP | H09-109573 A | 4/1997 |
| JP | 2000-062346 A | 2/2000 |
| JP | 2001-096883 A | 4/2001 |
| JP | 2001-150812 A | 6/2001 |
| JP | 2013-220641 A | 10/2013 |

OTHER PUBLICATIONS

Ultimaker (https://community.ultimaker.com/topic/13189-extra-support-around-holes-for-fasteners/) (Year: 2016).*
Japanese Office Action dated Feb. 26, 2019, in a counterpart Japanese patent application 2016-164214. (A machine translation (not reviewed for accuracy) attached.).

* cited by examiner

METHOD OF CREATING THREE-DIMENSIONALLY SHAPED OBJECT, PRINT DATA CREATION APPARATUS, AND COMPUTER-READABLE STORAGE MEDIUM

BACKGROUND OF THE INVENTION

Technical Field

The present invention relates to a method of creating a three-dimensionally shaped object, a print data creation apparatus, and a computer-readable storage medium.

Background Art

A medium, called a thermally expandable sheet, having on the inside an expansion layer that expands (protuberates) in accordance with the amount of heat that is absorbed, has been known for some time. There is also known a three-dimensional image forming system (system for creating a three-dimensionally shaped object) for forming (creating) a three-dimensional image as a three-dimensionally shaped object by forming, on a thermally expandable sheet using printing, an electromagnetic wave-thermal conversion layer in which electromagnetic waves are converted to heat, irradiating electromagnetic waves onto the thermally expandable sheet, and causing the expansion layer in the area where the electromagnetic-thermal conversion layer has been formed to expand and rise. Hereinafter, a thermally expandable sheet on which a three-dimensional image has been formed is called a "three-dimensional image forming sheet."

Three-dimensional image forming sheets have been used for some time in applications such as decorations and ornaments, for example. In applications such as decorations and ornaments, three-dimensional image forming sheets are framed one at a time in picture frames (frames). However, in recent years, three-dimensional image forming sheets have also come to be used in applications such as school education materials and picture books. In applications such as school education materials and picture books, a plurality of three-dimensional image forming sheets is bound together with fasteners in booklet form. These three-dimensional image forming sheets can become unfastened and separate from the book with use.

Japanese Patent Application Laid-Open Publication No. 2000-062346, for example, discloses, in relation to this type of three-dimensional image forming sheet, a technique for binding sheets into booklet form to produce a book (Patent Document 1).

Further, Japanese Patent Application Laid-Open Publication No. 2001-150812, for example, discloses a technique for forming around a three-dimensional image (three-dimensional model) a rectangular frame that is not related to the three-dimensional image (Patent Document 2).

SUMMARY OF THE INVENTION

The conventional techniques disclosed in Patent Document 1 and Patent Document 2 is not intended to satisfactorily protect a three-dimensional image. Thus, as described hereinbelow, the problem is that there are cases in which the conventional techniques disclosed in Patent Document 1 and Patent Document 2 are not able to satisfactorily preserve a three-dimensional image.

For example, a three-dimensional shape of a three-dimensional image forming sheet (i.e., the shape of the three-dimensional image and an expanded height of each area) will differ depending on the sheet. Therefore, protruding parts of various shapes are formed at various locations on each sheet.

The conventional technology disclosed in Patent Document 1 and Patent Document 2 does not take the following points into consideration in relation to three-dimensional image forming sheets such as this.

For example, when a plurality of three-dimensional image forming sheets has been overlaid one on the other, there is a likelihood of a three-dimensional image coming in contact with another sheet. Thus, there is a likelihood of three-dimensional images being rubbed, and of a three-dimensional image incurring damage, such as the color of the three-dimensional image fading, or the three-dimensional image peeling off.

In particular, when a plurality of three-dimensional image forming sheets are overlaid one on the other, and the edges of the sheets are bound with fasteners into booklet form, there is a likelihood that the edges on the unbound side will open widely in a fan-like manner centering around the bound portions (portions around the fasteners). Further, pressure is concentrated on the bound portions (the portions around the fasteners), and as a result of this, there is a likelihood of the sheets curving and becoming bent. Also, when the sheets open fan-like and become curved, there is a likelihood of the three-dimensional images being strongly rubbed, and of a three-dimensional image incurring damage, such as the color of the three-dimensional image fading, or the three-dimensional image peeling off.

Thus, there are cases where the background art is not able to satisfactorily preserve a three-dimensional image. Furthermore, the rectangular frame disclosed in Patent Document 2 is not intended to protect the three-dimensional image, and as such may be formed lower than the expanded height of the three-dimensional image (See FIG. 5(h) of Patent Document 2, for example).

The problem of the present invention is to make it possible to satisfactorily preserve a three-dimensional image. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a printer, including: a printing unit that prints a surface-textured image on a thermally expandable sheet based on grayscale data of an image to be printed on the thermally expandable sheet, the grayscale data defining patterns and heights of protuberations to be created from thermal expansion of the thermally expandable sheet; and a processor that creates image data for printing images on a plurality of thermally expandable sheets, the plurality of thermally expandable sheets having a prescribed fastening portion or portions at which the plurality of thermally expandable sheets is to be bound to form a booklet, wherein, for each of the plurality of thermally expandable sheets that is to form the booklet, the processor creates grayscale image data that include the grayscale data of the image to be printed as well as additional grayscale data that create an additional protuberation or protuberations that sandwich at least some of the prescribed fastening portion or portions on the thermally expandable sheet such that the height of the additional protuberation or protuberations is equal to or greater than a maximum height of the protuberations created by the grayscale of the image formed on the thermally expandable sheet, and wherein the processor outputs the created grayscale image data to the printing unit so as to print the corresponding surface-textured image and the additional protuberation or protuberations that sandwich the at least some of the prescribed fastening portion or portions on each of the thermally expandable sheets, thereby creating a buffer between overlaid thermally expandable sheets to protect the surface-textured image when bound.

In another aspect, the present disclosure provides a print data creation apparatus for a printing unit that prints a surface-textured image on a thermally expandable sheet based on grayscale data of an image to be printed on the thermally expandable sheet, the grayscale data defining patterns and heights of protuberations to be created from thermal expansion of the thermally expandable sheet, the print data creation apparatus including: a processor configured to be connected to the printing unit, the processor creating image data for printing images on a plurality of thermally expandable sheets, the plurality of thermally expandable sheets having a prescribed fastening portion or portions at which the plurality of thermally expandable sheets is to be bound to form a booklet, wherein, for each of the plurality of thermally expandable sheets that is to form the booklet, the processor creates grayscale image data that include the grayscale data of the image to be printed as well as additional grayscale data that create an additional protuberation or protuberations that sandwich at least some of the prescribed fastening portion or portions on the thermally expandable sheet such that the height of the additional protuberation or protuberations is equal to or greater than a maximum height of the protuberations created by the grayscale of the image formed on the thermally expandable sheet, and wherein the processor is configured to output the created grayscale image data to the printing unit so as to print the corresponding surface-textured image and the additional protuberation or protuberations that sandwich the at least some of the prescribed fastening portion or portions on each of the thermally expandable sheets, thereby creating a buffer between overlaid thermally expandable sheets to protect the surface-textured image when bound.

In another aspect, the present disclosure provides a method of creating surface-textured images on a plurality of thermally expandable sheets that each has a prescribed fastening portion or portions at which the plurality of thermally expandable sheets is to be bound to form a booklet, using a printing unit that prints the surface-textured images on each thermally expandable sheet based on grayscale data of an image to be printed on the thermally expandable sheet, the grayscale data defining patterns and heights of protuberations to be created from thermal expansion of the thermally expandable sheet, the method including: a creation step of creating image data for printing an image on each of the plurality of thermally expandable sheets using a processor; a printing step of printing grayscale images on the plurality of thermally expandable sheets in accordance with the image data created in the creation step using the printing unit; and a protuberating step of partially protuberating the thermally expandable sheets via thermal expansion by radiating light toward the grayscale image printed on each thermally expandable sheet, wherein, for each of the plurality of thermally expandable sheets that is to form the booklet, the creation step creates via the processor grayscale image data that include the grayscale data of the image to be printed as well as additional grayscale data that create an additional protuberation or protuberations that sandwich at least some of the prescribed fastening portion or portions on the thermally expandable sheet such that the height of the additional protuberation or protuberations is equal to or greater than a maximum height of the protuberations created by the grayscale of the image formed on the thermally expandable sheet, and wherein the printing step prints the corresponding surface-textured image and the additional protuberation or protuberations that sandwich the at least some of the prescribed fastening portion or portions on each of the thermally expandable sheets, thereby creating a buffer between overlaid thermally expandable sheets to protect the surface-textured image when bound.

In another aspect, the present disclosure provides a non-transitory storage medium having stored therein instructions, executable by a processor of a print data creation apparatus, the print data creation apparatus controlling a printing unit that prints a surface-textured image on a thermally expandable sheet based on grayscale data of an image to be printed on the thermally expandable sheet, the grayscale data defining patterns and heights of protuberations to be created from thermal expansion of the thermally expandable sheet, the instructions causing the processor to perform the following: creating image data for printing images on a plurality of thermally expandable sheets, the plurality of thermally expandable sheets having a prescribed fastening portion or portions at which the plurality of thermally expandable sheets is to be bound to form a booklet, wherein, for each of the plurality of thermally expandable sheets that is to form the booklet, the instruction causes the processor to create grayscale image data that include the grayscale data of the image to be printed as well as additional grayscale data that create an additional protuberation or protuberations that sandwich at least some of the prescribed fastening portion or portions on the thermally expandable sheet such that the height of the additional protuberation or protuberations is equal to or greater than a maximum height of the protuberations created by the grayscale of the image formed on the thermally expandable sheet, and wherein the instructions cause the processor to output the created grayscale image data to the printing unit so as to print the corresponding surface-textured image and the additional protuberation or protuberations that sandwich the at least some of the prescribed fastening portion or portions on each of the thermally expandable sheets, thereby creating a buffer between overlaid thermally expandable sheets to protect the surface-textured image when bound.

According to the present invention, it is possible to satisfactorily preserve a three-dimensional image.

It is to be understood that both the foregoing general description and the following detailed description are exemplary and explanatory, and are intended to provide further explanation of the invention as claimed.

DETAILED DESCRIPTION OF EMBODIMENTS

Figure 1:
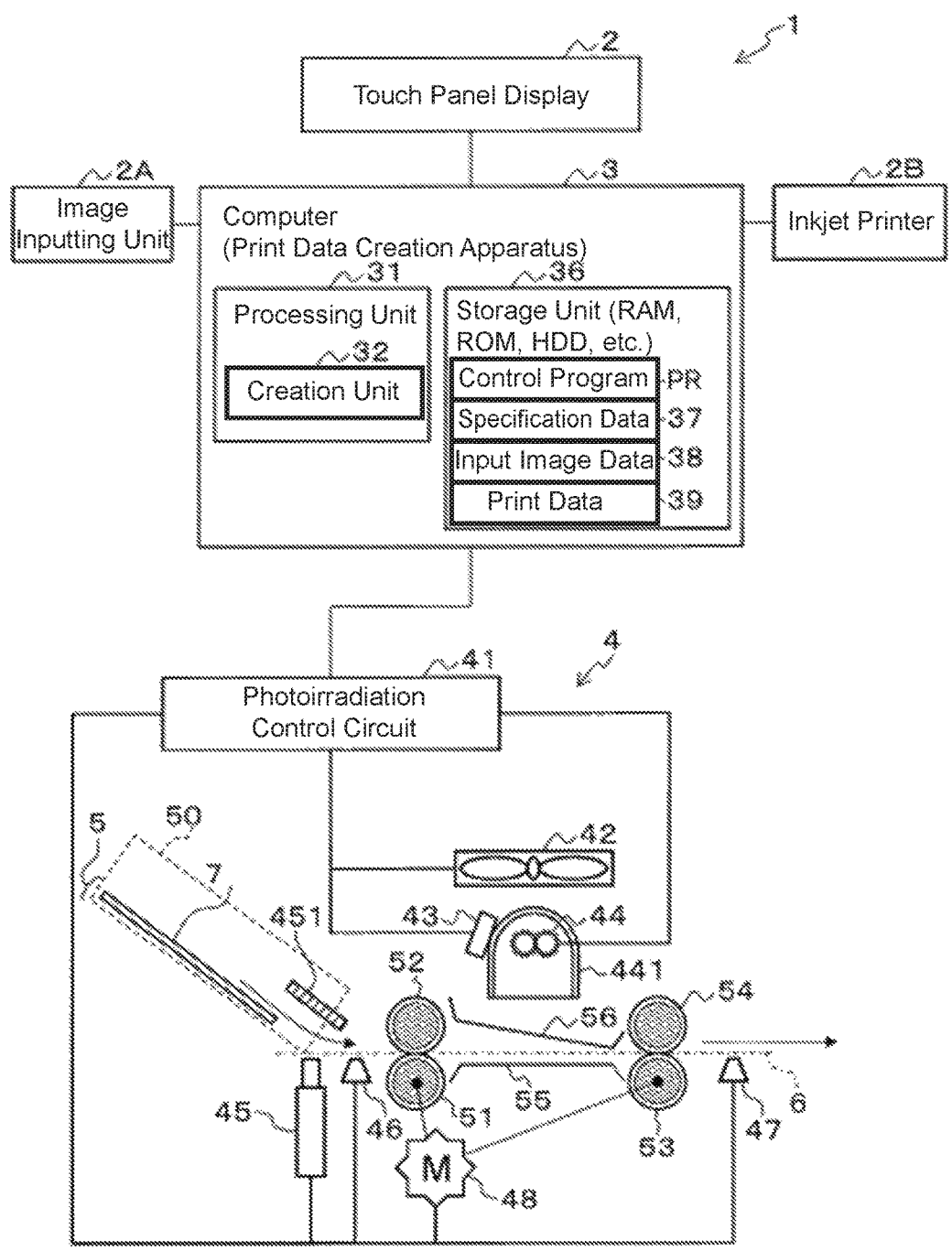
FIG. 1 is a schematic drawing showing a configuration of a system for creating a three-dimensionally shaped object, and a print data creation apparatus provided in this system according to an embodiment.

The embodiment of the present invention (referred to as "present embodiment" hereinbelow) will be explained in detail below with reference to figures. Furthermore, the figures are merely for schematically showing the present invention so that it can be readily understood. Accordingly, the present invention is not limited solely to the illustrations. In each figure, the same components, and components that are shared in common are given the same reference characters, and the descriptions thereof will not be repeated.

<Embodiment>

<Configuration of System for Creating Three-Dimensionally Shaped Object and Print Data Creation Apparatus Provided Therein>

A configuration of a system for creating a three-dimensionally shaped object, and a print data creation apparatus provided therein according to the present embodiment will be explained below with reference to FIG. 1. FIG. 1 is a schematic diagram showing a configuration of a computer 3 that functions as the system for creating a three-dimensionally shaped object 1, and the print data creation apparatus provided in this system according to the present embodiment.

The system for creating a three-dimensionally shaped object 1 according to the present embodiment is for forming a three-dimensional image on a thermally expandable sheet. The thermally expandable sheet has there inside an expansion layer that expands (protuberates) in accordance with the amount of heat that has been absorbed.

As shown in FIG. 1, the system for creating a three-dimensionally shaped object 1 according to the present embodiment is provided with a touch panel display 2, an image inputting unit 2A, an inkjet printer 2B, a computer 3, and a photoirradiation unit 4.

The touch panel display 2 is configured by laminating a liquid crystal display panel, which serves as a display unit, to a touch panel, which serves as an inputting unit. The touch panel display 2 is used to control the computer 3.

The image inputting unit 2A is an apparatus for inputting into the computer 3 used image data, which will be described below. The image inputting unit 2A is configured, for example, using a card reader or a drive apparatus that reads out data from a card-shaped storage medium or a disk-shaped storage medium, a scanner apparatus for optically reading a printed matter image, and a communication apparatus for communicating with another apparatus. As used here, the aforementioned "used image data" signifies image data to be used when forming a three-dimensional image on a thermally expandable sheet 7. The computer 3, which functions as a print data creation apparatus, creates grayscale image print data on the basis of the used image data.

The inkjet printer 2B (printing unit) is for printing, as an electromagnetic wave-thermal conversion layer, a grayscale image using ink containing carbon black on either the front surface or the back surface of a thermally expandable sheet 7. Carbon black is a thermal conversion material that converts electromagnetic wave energy to thermal energy. In the present embodiment, the inkjet printer 2B is described as forming a grayscale image on the back surface of a thermally expandable sheet 7.

The computer 3 is provided with a processing unit 31 and storage unit 36, and controls the image inputting unit 2A, the inkjet printer 2B, and the photoirradiation unit 4. The processing unit 31 is configured using a Central Processing Unit (CPU). The storage unit 36 is configured using Random Access Memory (RAM) and Read Only Memory (ROM), and a Hard Disk Drive (HDD), and so forth.

In the present embodiment, the computer 3 functions as the following three apparatuses.

(1) A print data creation apparatus for creating grayscale image print data.

(2) A print command apparatus for operating the inkjet printer 2B, and for printing a grayscale image on the thermally expandable sheet 7.

(3) A unit command apparatus for operating the photoirradiation unit 4, and for forming a three-dimensional image on the thermally expandable sheet 7.

The computer 3 has, on the inside of the processing unit 31, a creation unit 32 for creating grayscale image print data. The creation unit 32 acquires the used image data from the image inputting unit 2A as input image data, and creates grayscale image print data on the basis of specification data 37 and input image data stored beforehand in the storage unit 36.

The storage unit 36 stores beforehand a control program PR and the specification data 37. The control program PR is for specifying an operation of the creation unit 32. The specification data 37 is for specifying a portion that forms a protruding part 82 (see FIGS. 2A to 2D), which will be described below. The specification data 37 specifies, as a three-dimensionally shaped object, for example, the position, shape, and expanded height, and so forth, of the protruding part 82 (See FIGS. 2A to 2D), which will be described below. A plurality of types of specification data 37 is provided beforehand in accordance with the size of the thermally expandable sheet 7, and the size of a three-dimensional image part 81 (See FIGS. 2A to 2D) that serves as a three-dimensionally shaped object.

Further, input image data 38, which is the used image data, and grayscale image print data 39 are stored in the storage unit 36.

The photoirradiation unit 4 is an apparatus for creating a three-dimensionally shaped object that forms a three-dimensional image on a thermally expandable sheet 7 by irradiating visible light and near infrared light on the thermally expandable sheet 7 while conveying the thermally expandable sheet 7. The thermally expandable sheet 7 is a medium having there inside an expansion layer that expands in accordance with the amount of absorbed heat. A grayscale image is formed as an electromagnetic wave-thermal conversion layer on the back surface of the thermally expandable sheet 7 by the inkjet printer 2B using ink containing carbon black. When visible light and near infrared light are irradiated by the photoirradiation unit 4 onto the portion of the thermally expandable sheet 7 where the grayscale image has been formed, the near infrared light is converted to heat in this portion, and heat is generated. Accordingly, the expansion layer of this portion expands and rises, and as a result of this, a three-dimensional image is formed.

The photoirradiation unit 4 is provided with a photoirradiation control circuit 41, a cooling fan 42, a temperature sensor 43, a lamp heater 44, a reflection plate 441, a barcode reader 45, a mirror 451, a motor 48, insertion rollers 51, 52, and discharge rollers 53, 54.

The photoirradiation control circuit 41 is a control unit for controlling the operations of the cooling fan 42, the lamp heater 44, the insertion rollers 51, 52, and the discharge rollers 53, 54. The photoirradiation control circuit 41 is provided with a CPU and memory not shown in the FIG., and performs integrated control of the photoirradiation unit 4 on the basis of instructions from the computer 3. The photoirradiation control circuit 41 controls the cooling fan 42 on the basis of input signals from the barcode reader 45, an inlet sensor 46, and an outlet sensor 47. Further, the photoirradiation control circuit 41 controls the turning ON and OFF of the lamp heater 44 on the basis of input signals from the temperature sensor 43. Further, the photoirradiation control circuit 41, on the basis of input signals from the barcode reader 45, the inlet sensor 46, and the outlet sensor 47, controls the rotation of the motor 48 that drives the insertion rollers 51, 52 and the discharge rollers 53, 54. Further, the photoirradiation control circuit 41 has a function for changing the conveying speed of the thermally expandable sheet 7 in accordance with an arbitrary timing.

The cooling fan 42 is a cooling unit for air cooling the reflection plate 441. The temperature sensor 43 is a measuring unit for measuring the temperature of the reflection plate 441 as the ambient temperature of an optical heating unit, which will be described below. The lamp heater 44 is a member for generating visible light and near infrared light. In the present embodiment, the lamp heater 44 is described as being configured using a halogen lamp. The reflection plate 441 is a member for reflecting the visible light and the near infrared light generated by the lamp heater 44. The reflection plate 441 is shaped to cover the back of the lamp heater 44, and is arranged on the back side of the lamp heater 44. The front of the reflection plate 441 is mirror like, and functions as a reflective surface for reflecting light. The temperature sensor 43 is mounted to the back of the reflection plate 441. The lamp heater 44 and the reflection plate 441 irradiate visible light and near infrared light onto the thermally expandable sheet 7, and function as the optical heating unit for heating, using near infrared light, a portion of the thermally expandable sheet 7 on which a grayscale image (electromagnetic wave-thermal conversion layer) has been formed. In the present embodiment, the optical heating unit (the lamp heater 44 and the reflection plate 441) is described as being arranged above a conveying path 6. However, the optical heating unit (the lamp heater 44 and the reflection plate 441) can also be arranged below the conveying path 6.

The barcode reader 45 is for reading a barcode printed on the edge of the back surface of the thermally expandable sheet 7. When the thermally expandable sheet 7 is set inside a paper feeder 50 so that the back surface faces upwards, the mirror 451 reflects the barcode of the thermally expandable sheet 7 so as to be readable from the barcode reader 45. The system for creating a three-dimensionally shaped object 1 enables the orientation of the front surface and back surface of the thermally expandable sheet 7 to be determined in accordance with the barcode reader 45 reading the barcode.

The motor 48 is the driving source for the insertion rollers 51, 52 and the discharge rollers 53, 54. The insertion rollers 51, 52 are a conveying unit arranged on the upstream side of the optical heating unit (the lamp heater 44 and the reflection plate 441). The discharge rollers 536, 54 are a conveying unit arranged on the downstream side of the optical heating unit (the lamp heater 44 and the reflection plate 441).

The conveying path 6, indicated by a dashed line, is formed inside the photoirradiation unit 4. The conveying path 6 is formed extending from an insertion part 5, where the thermally expandable sheet 7 is inserted, to a discharge part (not shown in the figure) from which the thermally expandable sheet 7 is discharged. The paper feeder 50 is arranged inside the insertion part 5. The photoirradiation unit 4 is provided along the conveying path 6 with the paper feeder 50, the inlet sensor 46, the insertion rollers 51, 52, a lower guide 55, an upper guide 56, the discharge rollers 53, 54, and the outlet sensor 47.

Furthermore, in the present embodiment, the "front end" and the "rear end" of the photoirradiation unit 4 are based on the orientation of the thermally expandable sheet 7, which is the conveyed medium. In the example shown in the figure, the side from which the thermally expandable sheet 7 is discharged (i.e., the downstream side in the direction of conveyance) is the front end side of the photoirradiation unit 4, and the side from which the thermally expandable sheet 7 is inserted (i.e., the upstream side in the direction of conveyance) is the rear end side of the photoirradiation unit 4.

The paper feeder 50 is for supplying the thermally expandable sheet 7 to the optical heating unit. The photoirradiation unit 4 starts conveying and photoirradiating the thermally expandable sheet 7 when the thermally expandable sheet 7 has been inserted from the insertion part 5 and set inside the paper feeder 50, and photoirradiation has been instructed from the touch panel display 2. The conveying thereof is started by a not-shown conveyance mechanism provided in the paper feeder 50.

The inlet sensor 46 is a detection sensor for detecting the thermally expandable sheet 7. The inlet sensor 46 detects that the front edge of the thermally expandable sheet 7 has reached a position immediately in front of the insertion rollers 51, 52, and that the rear edge of the thermally expandable sheet 7 has passed through the position immediately in front of the insertion rollers 51, 52.

The insertion rollers 51, 52 are respectively provided on the right and left of the conveying path 6, and convey the thermally expandable sheet 7 by sandwiching the edge thereof from the top and bottom. These insertion rollers 51, 52 are connected to the motor 48 via a not-shown power transmission mechanism, and are driven by the motor 48.

The lower guide 55 and the upper guide 56 are guide members for guiding the conveyance of the thermally expandable sheet 7. In the present embodiment, the lower guide 55 and the upper guide 56 exhibit an elongated plate-like shape, and guide the thermally expandable sheet 7 from the top and bottom of the conveying path 6. So as not to become an obstacle to the conveyance of the thermally expandable sheet 7, the front end part and the rear end part of the lower guide 55 constitute downwardly bent shapes. Preferably, the lower guide 55 should be made from a sturdy metal material. Further, so as not to become an obstacle to the conveyance of the thermally expandable sheet 7, the front end part and the rear end part of the upper guide 56 constitute upwardly bent shapes. Preferably, the upper guide 56 should be made from a transparent glass or plastic material, or the like.

The discharge rollers 53, 54 convey the thermally expandable sheet 7 by sandwiching the same from the top and bottom. These discharge rollers 53, 54 are also connected to the motor 48 via a not-shown power transmission mechanism, and are driven by the motor 48.

The outlet sensor 47, the same as the inlet sensor 46, is a detection sensor for detecting the thermally expandable sheet 7. The outlet sensor 47 detects that the front edge of the thermally expandable sheet 7 has reached a position immediately after the discharge rollers 53, 54, and that the rear edge of the thermally expandable sheet 7 has passed through the position immediately after the discharge rollers 53, 54.

<Configuration of Three-Dimensional Image Forming Sheet>

In the present embodiment, the system for creating a three-dimensionally shaped object 1 creates print data 39 (See FIG. 1) using the computer 3, which is the print data creation apparatus, and forms a grayscale image on the back surface of the thermally expandable sheet 7 using the inkjet printer 2B. Then, the system for creating a three-dimensionally shaped object 1 creates three-dimensional image forming sheets 17 and 27, which are shown in FIGS. 2A to 2D and FIGS. 3A to 3D, for example, by heating the thermally expandable sheet 7 with the photoirradiation unit 4 during conveying. FIGS. 2A to 2D show a configuration of the three-dimensional image forming sheet 17. FIGS. 3A to 3D show a configuration of the three-dimensional image forming sheet 27, which exhibits a different shape than the three-dimensional image forming sheet 17.

Figure 2A:
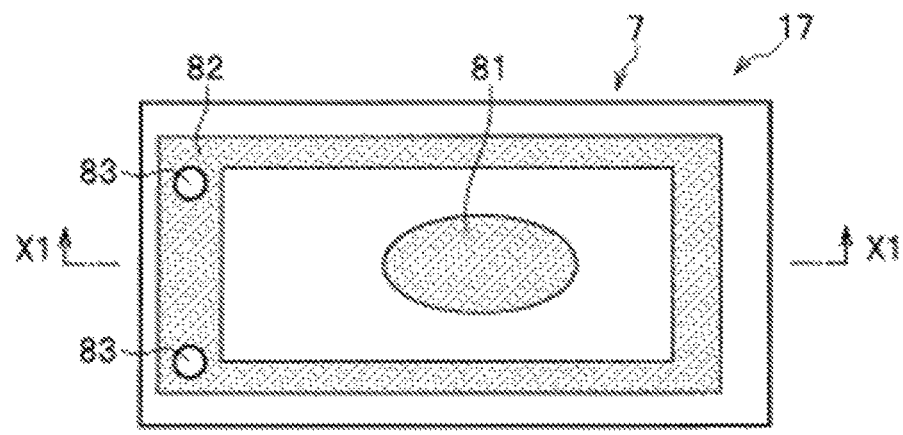
FIGS. 2A to 2D are drawings showing a configuration of a three-dimensional image forming sheet according to an embodiment.
Figure 2B:
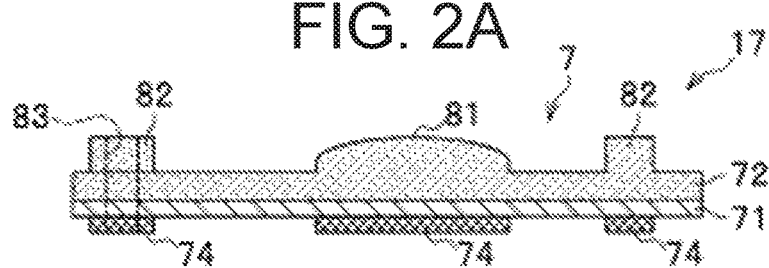
Figure 2C:
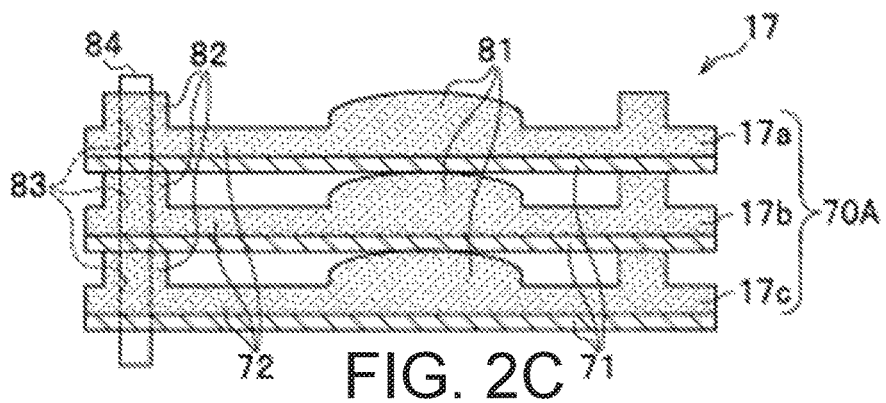
Figure 2D:
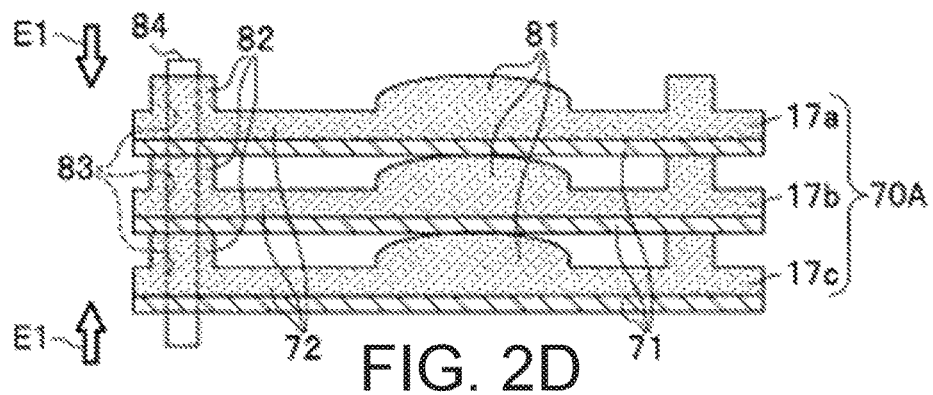

FIG. 2A shows a shape of the three-dimensional image forming sheet 17 when viewed from above. FIG. 2B shows a sectional shape when the three-dimensional image forming sheet 17 has been cut along the line X1-X1 shown in FIG. 2A. FIG. 2C shows a structure when a plurality of three-dimensional image forming sheets 17 has been bound using a fastener 84. FIG. 2D shows a state when pressure has been applied to the fastened portions (portions around the fastener 84), which are bound portions of the three-dimensional image forming sheets 17.

As shown in FIG. 2A, the three-dimensional image forming sheet 17 exhibits a rectangular shape when viewed from above, and is provided with a three-dimensional image part 81 and a protruding part 82 on the inside thereof. The three-dimensional image part 81 is an area in which is formed the three-dimensional image that serves as a three-dimensionally shaped object for tactile reading that is touched by various people. The protruding part 82 is a three-dimensional structure (three-dimensionally shaped object) that differs from the three-dimensional image, and functions as a frame part that protects the three-dimensional image part 81. The expanded height of the protruding part 82 is equal to or higher than the expanded height of the point of maximum expansion of the three-dimensional image part 81. That is, the extent of protrusion of the protruding part 82 is equal to or greater than the extent of protrusion of the point of maximum expansion of the three-dimensional image part 81. Therefore, the region that forms the protruding part 82 is set as a buffer region for when another thermally expandable sheet 7 has been overlaid.

The protruding part 82 is formed in the margin (area where the three-dimensional image is not formed) of the three-dimensional image forming sheet 17. In the example shown in FIG. 2A, the protruding part 82 exhibits a rectangular shape that is parallel on each side of the three-dimensional image forming sheet 17. That is, the protruding part 82 is formed in the vicinity of the sides of the three-dimensional image forming sheet 17 in a rectangular shape that is slightly shorter in length than each side, and that has a certain width.

A fastening hole 83 for passing a fastener 84 through (See FIG. 2C) is formed inside the protruding part 82. A plurality of fastening holes 83 (two in the example shown in the figure) is formed to pass through from the front surface to the back surface of the three-dimensional image forming sheet 17.

As shown in FIG. 2B, the three-dimensional image forming sheet 17 is a structure in which a substrate 71 and a foamed resin layer (expansion layer) 72 are laminated in that order.

The substrate 71 is made from paper, a cloth such as canvas, or a panel material such as plastic, and the quality of the material is not particularly limited.

The foamed resin layer (expansion layer) 72 is a structure in which a thermal foaming agent (thermally expandable microcapsules) is distributively arranged inside a binder, which is a thermoplastic resin. The foamed resin layer (expansion layer) 72 thereby foamingly expands in accordance with the amount of heat that is absorbed.

An electromagnetic wave-thermal conversion layer 74, which is a grayscale image, is formed on the back surface of the three-dimensional image forming sheet 17. The electromagnetic wave-thermal conversion layer 74 is printed using ink containing carbon black, for example, and converts visible light and near infrared light (electromagnetic waves) into heat.

The three-dimensional image part 81 and the protruding part 82 are formed on the surface of the portion of the three-dimensional image forming sheet 17 on which the electromagnetic wave-thermal conversion layer 74 has been formed in accordance with the expansion of the foamed resin layer (expansion layer) 72. The three-dimensional image part 81 and the protruding part 82 are formed so as to protrude upwardly from the surface of portions of the three-dimensional image forming sheet 17 that have not been expanded. The upper surface of the protruding part 82 is planar. Further, the extent of protrusion of the protruding part 82 is equal to or greater than the extent of protrusion of the point of maximum expansion of the three-dimensional image part 81. The grayscale image electromagnetic wave-thermal conversion layer 74, for forming a three-dimensional image part 81 and a protruding part 82 such as these, is formed on the back surface of the three-dimensional image forming sheet 17. FIG. 2B shows the thickness of the electromagnetic wave-thermal conversion layer 74 in an exaggerated manner to emphasize the electromagnetic wave-thermal conversion layer 74. The grayscale image is the same shape as the three-dimensional image part 81 and the protruding part 82. Further, the density of the grayscale image becomes denser the higher the expanded height of the three-dimensional image part 81 and the protruding part 82.

As shown in FIG. 2C, a book 70A is formed by binding a plurality of three-dimensional image forming sheets 17 into booklet form using a fastener 84. As will be explained in the section "Effects of Three-Dimensional Image Forming Sheet" described below, it is possible to produce an effect in this book 70A.

Figure 3A:
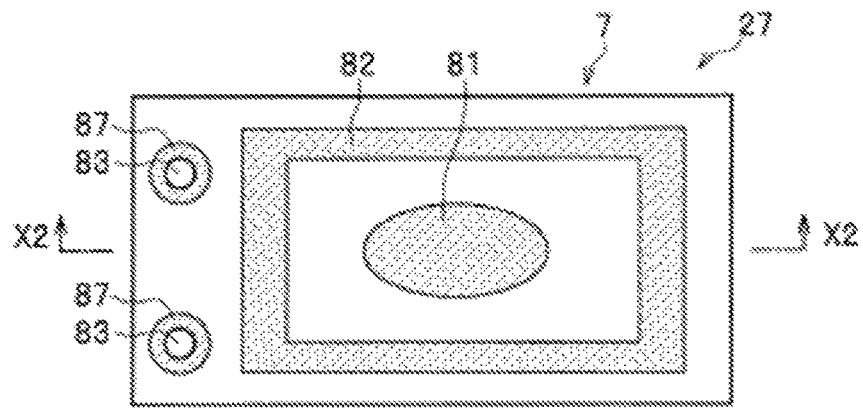
FIGS. 3A to 3D are drawings showing a configuration of a three-dimensional image forming sheet according to an embodiment.
Figure 3B:
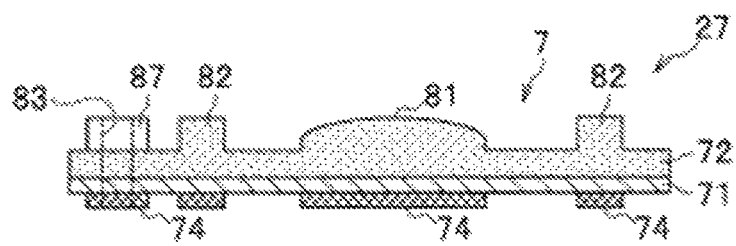
Figure 3C:
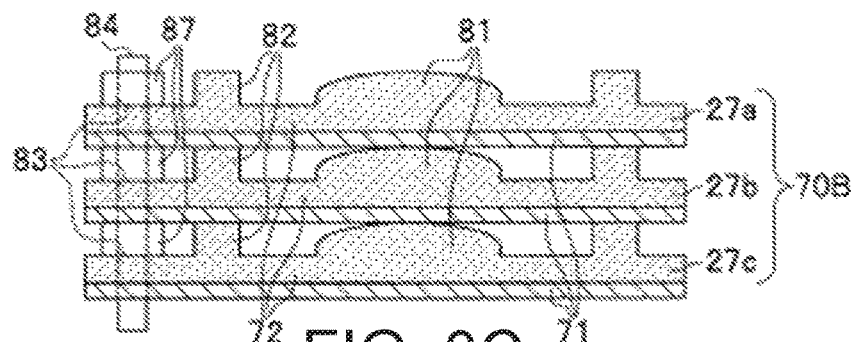
Figure 3D:
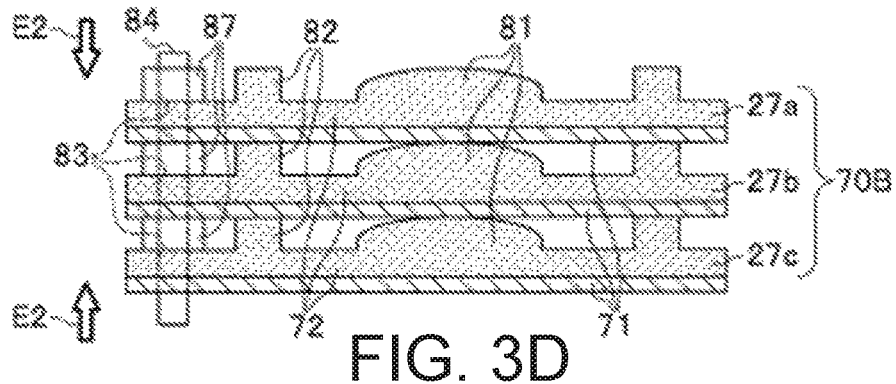

Meanwhile, FIG. 3A shows a shape of the three-dimensional image forming sheet 27 when viewed from above. FIG. 3B shows a sectional shape when the three-dimensional image forming sheet 27 has been cut along the line X2-X2 shown in FIG. 3A. FIG. 3C shows a structure when a plurality of three-dimensional image forming sheets 27 has been bound using a fastener 84. FIG. 3D shows a state when pressure has been applied to the bound portions (portions around the fastener 84) of the three-dimensional image forming sheets 27.

As shown in FIGS. 3A and 3B, the three-dimensional image forming sheet 27 differs in the following ways from the three-dimensional image forming sheet 17 (See FIGS. 2A and 2B).

(1) There is provided a protruding part 82 that functions as a frame part surrounding the three-dimensional image, and a plurality (two in the example shown in the figure) of protruding parts 87 that function as separate parts that are separate from the protruding part 82 (frame part).

(2) The fastening hole 83 is formed to pass through the inside of each protruding part 87 (separate parts).

Furthermore, the expanded height of the protruding part 87 is about the same as the expanded height of the protruding part 82. Therefore, the expanded height of the protruding part 87 is equal to or higher than the expanded height of the point of maximum expansion of the three-dimensional image part 81. That is, the region that forms the protruding part 87 is set as a buffer region for when another thermally expandable sheet 7 has been overlaid. Further, the protruding part 87 exhibits a circular shape when viewed from above.

As shown in FIG. 3C, a book 70B is formed by binding a plurality of three-dimensional image forming sheets 27 into booklet form using a fastener 84. As will be explained in the section "Effects of Three-Dimensional Image Forming Sheet" described below, it is possible to produce an effect in this book 70B the same as in the book 70A (See FIGS. 2C and 2D).

<Effects of Three-Dimensional Image Forming Sheet>

The effects of the three-dimensional image forming sheets 17 and 27 will be explained below. To explain the effects of the three-dimensional image forming sheets 17 and 27 here in an easy-to-understand manner, first, reference will be made to FIGS. 7A to 7D and FIGS. 8A to 8D, and configurations of three-dimensional image forming sheets 617 and 627 according to first and second comparison examples will be explained. Thereafter, the effects of the three-dimensional image forming sheet 17 according to the present embodiment will be explained.

(Three-Dimensional Image Forming Sheets According to First and Second Comparison Examples)

Figure 7A:
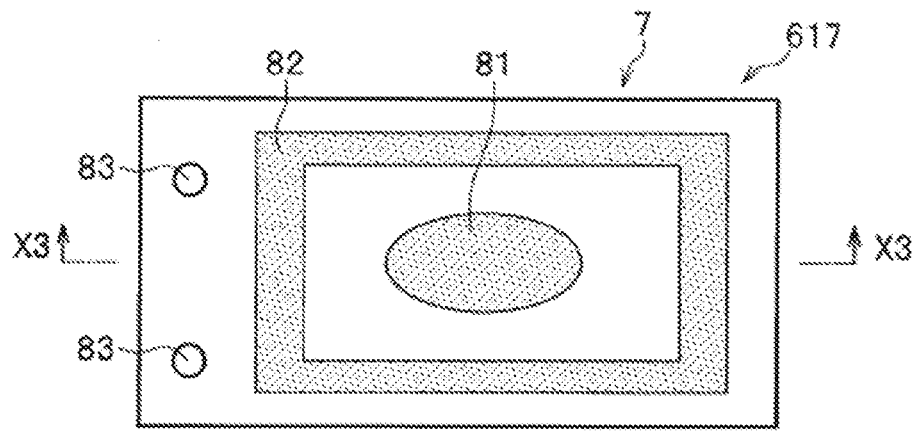
FIGS. 7A to 7D show a configuration of a three-dimensional image forming sheet according to a first comparison example.
Figure 7B:
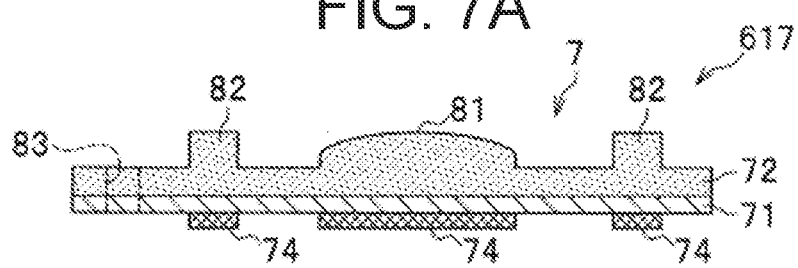
Figure 7C:
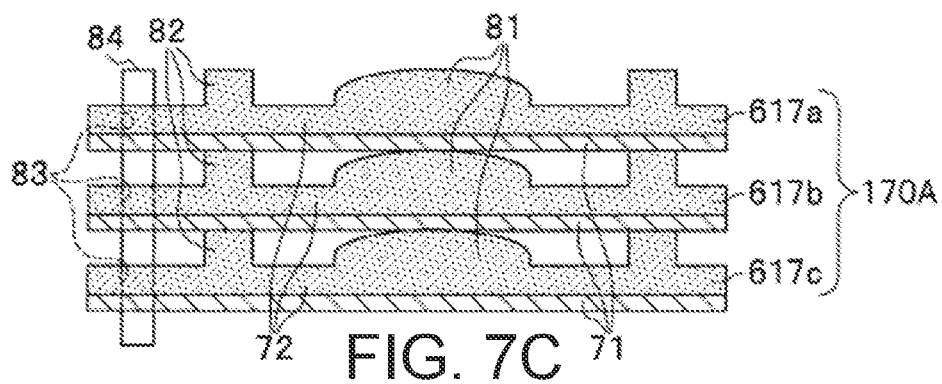
Figure 7D:
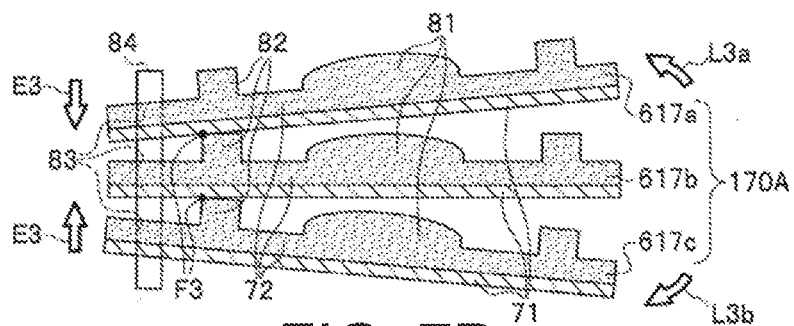

FIGS. 7A to 7D show a configuration of a three-dimensional image forming sheet 617 according to a first comparison example. FIG. 7A shows a shape of the three-dimensional image forming sheet 617 when viewed from above. FIG. 7B shows a sectional shape when the three-dimensional image forming sheet 617 has been cut along the line X3-X3 shown in FIG. 7A. FIG. 7C shows a structure when a plurality of three-dimensional image forming sheets 617 has been bound using a fastener 84. FIG. 7D shows a state when pressure has been applied to the bound portions (portions around the fastener 84) of the three-dimensional image forming sheets 617.

Meanwhile, FIG. 8 shows a configuration of a three-dimensional image forming sheet 627 according to a second comparison example. FIG. 8A shows a shape of the three-dimensional image forming sheet 627 when viewed from above. FIG. 8B shows a sectional shape when the three-dimensional image forming sheet 627 has been cut along the line X4-X4 shown in FIG. 8A. FIG. 8C shows a structure when a plurality of three-dimensional image forming sheets 627 has been bound using a fastener 84. FIG. 8D shows a state when pressure has been applied to the bound portions (portions around the fastener 84) of the three-dimensional image forming sheets 627.

As shown in FIGS. 7A and 7B, the three-dimensional image forming sheet 617 according to the first comparison example differs in the following ways from the three-dimensional image forming sheet 17 according to the present embodiment (See FIGS. 2A and 2B).

(1) The protruding part 82 is formed smaller in the overhead view than that of the three-dimensional image forming sheet 17 according to the present embodiment.

(2) The fastening hole 83 is formed in a non-expanded portion on the outer side of the protruding part 82.

As shown in FIG. 7C, a book 170A is formed by binding a plurality of three-dimensional image forming sheets 617 (the three sheets 617*a*, 617*b*, and 617*c* in the example shown in the figure) into booklet form using a fastener 84. When pressure is applied to the bound portions (portions around the fastener 84) of these three-dimensional image forming sheets 617, the following state occurs.

The fastening hole 83 of each three-dimensional image forming sheet 617 is formed in a non-expanded portion on the outer side of the protruding part 82. Thus, as shown in FIG. 7D, for example, given a case where pressure E3 is applied to the portion on the outer side of the bound portion (portion around the fastener 84), the pressure E3 presses this portion down. As a result of this, there is a likelihood of the edge on the unbound side opening widely in a fan-like manner (See arrows L3*a* and L3*b*) centering around the bound portion (portion around the fastener 84).

Further, the pressure is concentrated on the locations F3 where the protruding part 82 of the lower side sheet comes in contact with the substrate 71 of the upper side sheet, and as a result of this, there is a likelihood of the three-dimensional image forming sheet 617 being deformed (e.g., being curved and/or bent). Thus, there is a likelihood of each of the three-dimensional image forming sheets 617 being deformed.

Figure 8A:
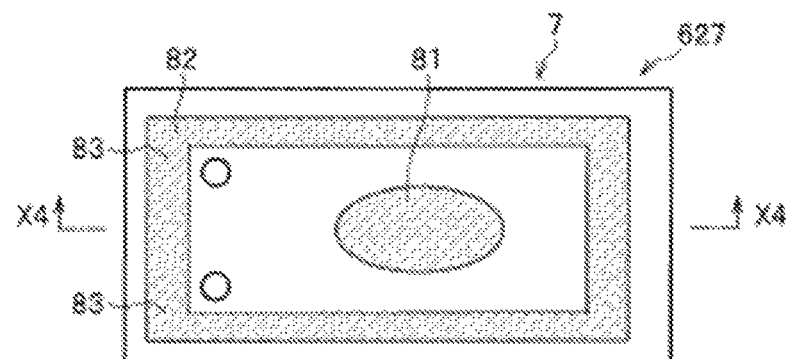
FIGS. 8A to 8D show a configuration of a three-dimensional image forming sheet according to a second comparison example.
Figure 8B:
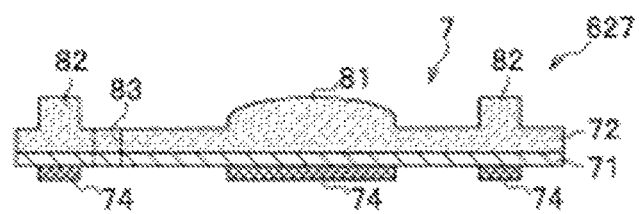

Meanwhile, as shown in FIGS. 8A and 8B, the three-dimensional image forming sheet 627 according to the second comparison example differs in the following way from the three-dimensional image forming sheet 17 according to the present embodiment (See FIGS. 2A and 2B).

The fastening hole 83 is formed in a non-expanded portion on the inner side of the protruding part 82.

Figure 8C:
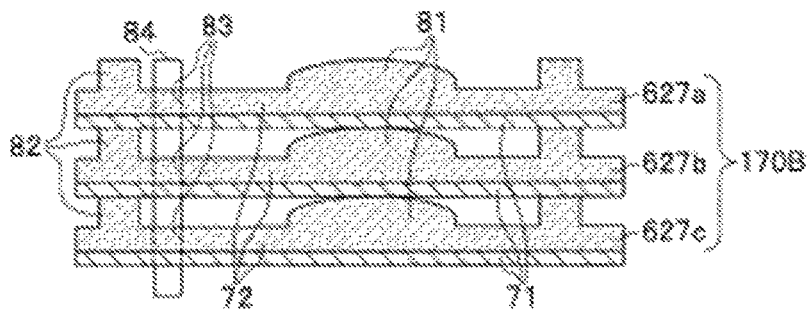

As shown in FIG. 8C, a book 170B is formed by binding a plurality of three-dimensional image forming sheets 627 (the three sheets 627*a*, 627*b*, and 627*c* in the example shown in the figure) into booklet form using a fastener 84. When pressure is applied to the bound portions (portions around the fastener 84) of these three-dimensional image forming sheets 627, the following state occurs.

Figure 8D:
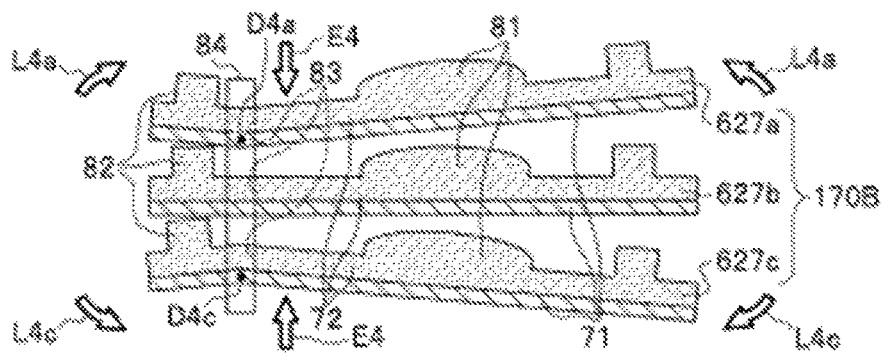

(1) The fastening hole 83 of each three-dimensional image forming sheet 627 is formed in a non-expanded portion on the inner side of the protruding part 82. Accordingly, as shown in FIG. 8D, for example, given a case where pressure E4 is applied to the bound portions (portions around the fastener 84), the pressure E4 is concentrated on the bound portions (portions around the fastener 84). As a result of this, there is a likelihood of the three-dimensional image forming sheet 627 being deformed (e.g., being curved and/or bent) at the bound portions (portions around the fastener 84). For example, the topmost sheet 627*a* is deformed such that the edges on both sides are pulled up centering around the bound portion (portion around the fastener 84) (See arrow L4*a*). Further, for example, the bottommost sheet 627*c* is deformed such that the edges on both sides are pulled down centering around the bound portion (portion around the fastener 84) (See arrow L4*c*).

(2) Given a case in which the three-dimensional image forming sheet 627 has been deformed, there is a likelihood of the three-dimensional image of a lower-side sheet coming in contact with the substrate 71 of an upper-side sheet. Thus, there is a likelihood of the three-dimensional images being rubbed strongly, and of a three-dimensional image incurring damage, such as the color of the three-dimensional image fading, or the three-dimensional image peeling off.

(Three-Dimensional Image Forming Sheet According to the Embodiment)

By contrast, the three-dimensional image forming sheets 17 according to the present embodiment (See FIGS. 2A to 2D) can produce the following effect when bound together as the book 70A.

(1) The expanded height of the protruding part 82 of each three-dimensional image forming sheet 17 is equal to or higher than the expanded height of the point of maximum expansion of the three-dimensional image part 81. Accordingly, as shown in FIG. 2D, for example, even given a case where pressure E1 has been applied to the bound portions (portions around the fastener 84) of the book 70A, the bound portions (portions around the fastener 84) can be protected by the protruding part 82. Thus, the deformation (curving and/or bending) of the three-dimensional image forming sheets 17 of the book 70A can be suppressed.

(2) The three-dimensional image of each three-dimensional image forming sheet 17 of the book 70A can be separated from another sheet by the protruding part 82 so that the three-dimensional image does not come in contact with the other sheet. Thus, it is possible to prevent the rubbing of the three-dimensional images in the book 70A, and thus prevent the occurrence of three-dimensional image damage, such as the color of the three-dimensional image fading, and/or the three-dimensional image peeling off.

Therefore, the three-dimensional image forming sheets 17 can be satisfactorily bound as the book 70A.

Similarly, the three-dimensional image forming sheets 27 according to the present embodiment (See FIGS. 3A to 3D) make it possible to produce the following effect when bound together as the book 70B.

(1) The expanded height of the protruding part 87 of each three-dimensional image forming sheet 27 is equal to or higher than the expanded height of the point of maximum expansion of the three-dimensional image part 81. Accordingly, as shown in FIG. 3D, for example, even given a case where pressure E2 has been applied to the bound portions (portions around the fastener 84) of the book 70B, the bound portions (portions around the fastener 84) can be protected by the protruding part 87. Thus, the deformation (curving and/or bending) of the three-dimensional image forming sheets 27 of the book 70B can be suppressed.

(2) The three-dimensional image of each three-dimensional image forming sheet 27 of the book 70B can be separated from another sheet by the protruding part 87 so that the three-dimensional image does not come in contact with the other sheet. Thus, it is possible to prevent the rubbing of the three-dimensional images in the book 70B, and thus prevent the occurrence of three-dimensional image damage, such as the color of the three-dimensional image fading, and/or the three-dimensional image peeling off.

Therefore, the three-dimensional image forming sheets 27 can be satisfactorily bound as the book 70B.

<Modification Example of Three-Dimensional Image Forming Sheet>

Figure 4A:
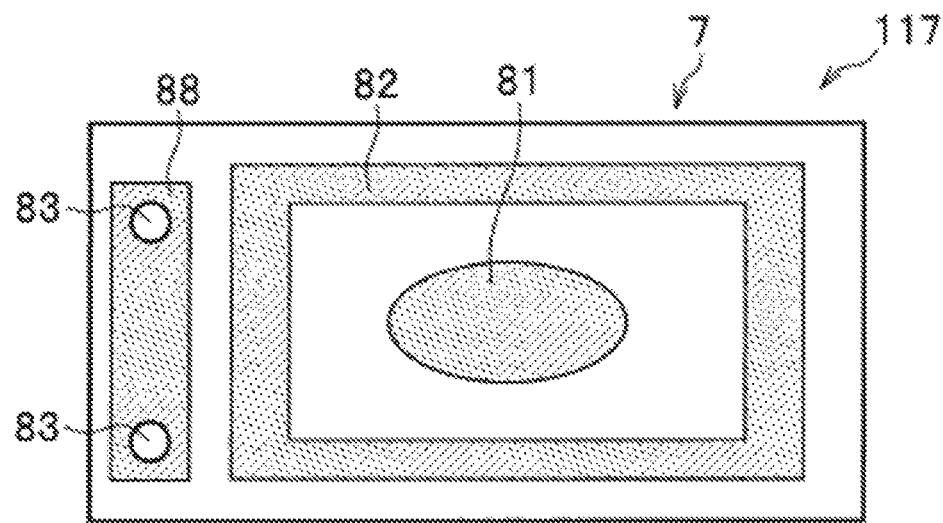
FIGS. 4A and 4B show a modification example of a three-dimensional image forming sheet.
Figure 4B:
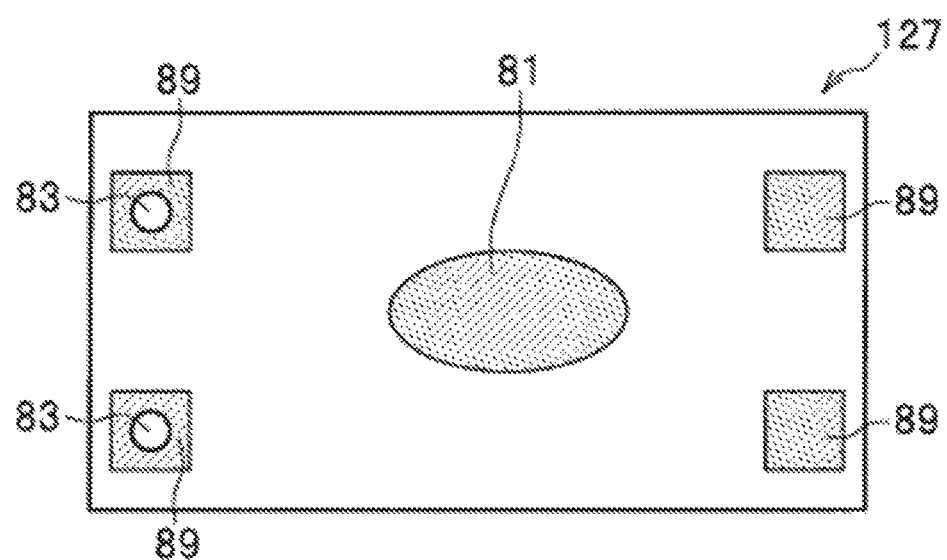

The three-dimensional image forming sheet formed by the system for creating a three-dimensionally shaped object 1 may be a shape in which the fastening hole 83 is formed inside a protruding part, but is not limited to the shape shown in FIGS. 2A to 2D and FIGS. 3A to 3D. For example, the three-dimensional image forming sheet 27 shown in FIGS. 3A to 3D can be modified like three-dimensional image forming sheets 117 and 127 shown in FIGS. 4A and 4B. FIGS. 4A and 4B show a modification example of a three-dimensional image forming sheet.

In the example shown in FIG. 4A, the three-dimensional image forming sheet 117 differs from the three-dimensional image forming sheet 27 (See FIG. 3A) in that a single protruding part 88 is provided instead of the two protruding parts 87. The protruding part 88 is an area inside of which a plurality (two in the example shown in the figure) of fastening holes 83 have been formed. The expanded height of the protruding part 82 as about the same as the expanded height of the protruding part 82. The protruding part 88 exhibits a rectangular shape when viewed from above.

In the example shown in FIG. 4B, the three-dimensional image forming sheet 127 differs in the following ways from the three-dimensional image forming sheet 117 (See FIG. 3A).

(a) Instead of the protruding part 82, four protruding parts 89 are formed in the margins of the three-dimensional image forming sheet 127.

(b) The fastening holes 83 are formed passing through the inside of the two, of the four protruding parts 89, arranged on the left side of the three-dimensional image forming sheet 127.

The expanded heights of the four protruding parts 89 are about the same. In other words, the images forming the four protruding parts 18 exhibit approximately the same density. The four protruding parts 89 exhibit a square shape when viewed from above. That is, in the examples shown in FIGS. 4A and 4B, the regions that form the protruding parts 88 and 89 are set as buffer regions for when other thermally expandable sheets are overlaid. In this manner, in addition to the protruding parts formed around the fastening holes 83 (the two protruding parts arranged on the right side of the three-dimensional image forming sheet 127), it is possible to form other protruding parts (the two protruding parts arranged on the left side of the three-dimensional image forming sheet 127).

<Operation of System for Creating Three-Dimensionally Shaped Object>

Figure 5:
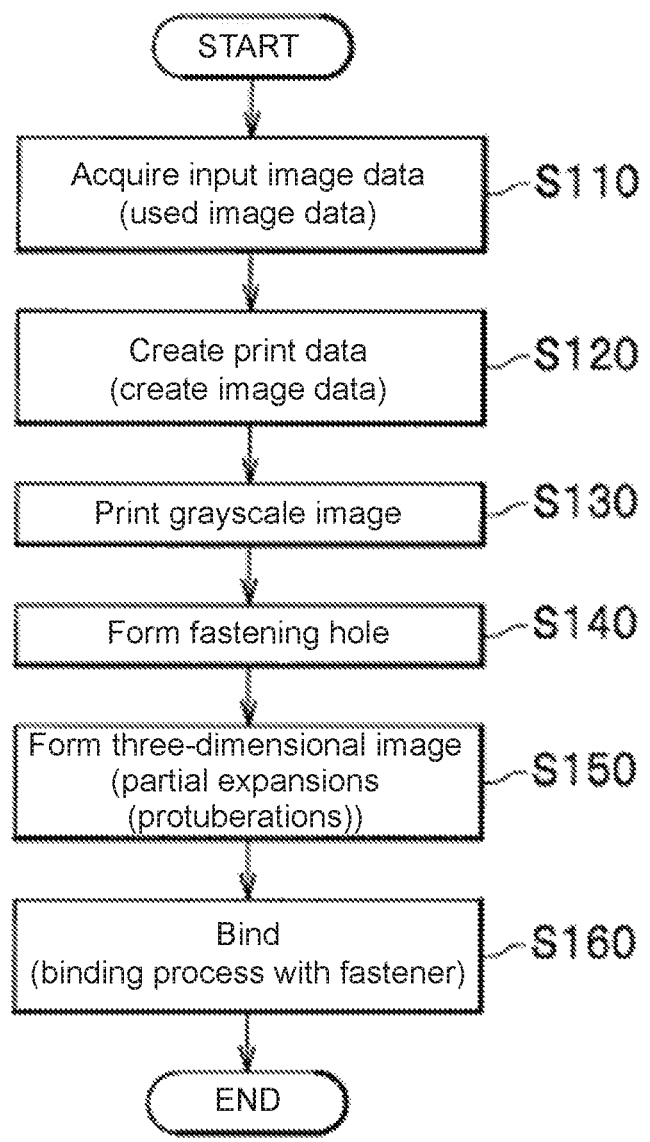
FIG. 5 is a flowchart showing the operations of the system for creating a three-dimensionally shaped object according to an embodiment.

The operation of the system for creating a three-dimensionally shaped object 1 will be explained below with reference to FIG. 5. FIG. 5 is a flowchart showing the operations of the system for creating a three-dimensionally shaped object 1.

As shown in FIG. 5, first, in Step S110, the computer 3 of the system for creating a three-dimensionally shaped object 1 acquires, as input image data 38, used image data from the image inputting unit 2A, and stores the same in the storage unit 36.

Next, in Step S120, the computer 3 creates grayscale image print data 39 on the basis of specification data 37 and input image data 38 stored in the storage unit 36, and stores the same in the storage unit 36. The print data 39 is image data for printing an image on the thermally expandable sheet 7. The grayscale of an image to be printed is set in the print data 39. Step S120 corresponds to a creation step for creating print data that serves as image data for printing a grayscale image on the thermally expandable sheet 7.

At this time, the computer 3 creation unit 32 (See FIG. 1) creates the print data so that the three-dimensional image part 81 and the protruding part 82 are formed on the front surface of the thermally expandable sheet 7. Specifically, in addition to a three-dimensional image part grayscale image for forming the three-dimensional image, the creation unit 32 creates print data that adds a protruding part grayscale image for forming the protruding part 82 that surrounds the three-dimensional image, the protruding part 82 including there inside a region for forming a fastening hole 83.

As shown in FIGS. 2A and 2B, for example, at this time the creation unit 32 creates print data that causes a portion that surrounds the periphery of the three-dimensional image part 81, and a portion for binding the three-dimensional image forming sheets 17 to expand as a protruding part 82 separately from the three-dimensional image part 81. Or, as shown in FIGS. 3A and 3B, for example, the creation unit 32 creates print data that causes a portion that surrounds the periphery of the three-dimensional image part 81 to expand as the protruding part 82 separately from the three-dimensional image part 81, and also causes a portion for binding the three-dimensional image forming sheets 27 to expand as a protruding part 87. In so doing, the creation unit 32 detects, from among the input image data 38, the point of maximum expansion of the three-dimensional image part 81. Then, the creation unit 32 creates print data so that the expanded heights of the protruding parts 82 and 87 are equal to or higher than the expanded height of the point of maximum expansion of the three-dimensional image part 81. In other words, the creation unit 32 creates print data so that the fastening hole 83 is surrounded by a region where the expanded height (protuberation height) resulting from thermal expansion becomes the highest.

Next, in Step S130, the computer 3 operates the inkjet printer 2B, and, on the basis of the print data 39 stored in the storage unit 36, prints on the back surface of the thermally expandable sheet 7 a grayscale image using ink containing carbon black, which is a thermal conversion material. In so doing, the inkjet printer 2B controls the amount of carbon black-containing ink on the basis of the print data 39. Step S130 corresponds to a printing step for printing a grayscale image on the thermally expandable sheet 7 on the basis of the print data serving as the image data created in the creation step (Step S120).

Next, in Step S140, the computer 3 operates a machine tool, such as a not-shown drilling machine, to form the fastening hole 83 in the thermally expandable sheet 7. Furthermore, the processing of Step S140 may be performed by an operator, or the like, of the system for creating a three-dimensionally shaped object 1 manually operating a machine tool, such as the not-shown drilling machine.

Next, in Step S150, the computer 3 forms a three-dimensional image on the front surface of the thermally expandable sheet 7 by operating the photoirradiation unit 4, heating the thermally expandable sheet 7, and partially expanding (protuberating) the thermally expandable sheet 7 via thermal expansion. Step S150 corresponds to a protuberation step for partially expanding (protuberating) the thermally expandable sheet 7 via thermal expansion.

Next, in Step S160, the computer 3 operates a not-shown bookbinding apparatus, overlays a plurality of thermally expandable sheets 7 (e.g., three-dimensional image forming sheets 17, 27) on which has been formed a three-dimensional image, and performs a binding process using a fastener 84. The books 70A, 70B, and so forth are thereby bound. Furthermore, the processing of Step S160 may be performed by the system for creating a three-dimensionally shaped object 1 operator, or the like, manually operating the not-shown bookbinding apparatus. Alternatively, the processing of Step S160 may be performed by overlaying a plurality of thermally expandable sheets 7 on which an operator, or the like, has manually formed a three-dimensional image, and performing binding using a fastener 84.

<Main Characteristics of the Present Embodiment>

In the pertinent configuration, the present embodiment has the following characteristics. As an example of a three-dimensional image forming sheet, the three-dimensional image forming sheet 17 (See FIGS. 2A to 2D) will be explained here.

(1) The computer 3, which is the print data creation apparatus, stores in the storage unit 36 beforehand the specification data 37 specifying the position, shape, expanded height, and so forth of the protruding part 82 surrounding the periphery of a three-dimensional image for use in tactile reading. Further, the computer 3 has the creation unit 32 for creating grayscale image print data 39. The creation unit 32 creates the print data 39 on the basis of the specification data 37 and the input image data 38 (used image data).

(2) In so doing, the creation unit 32 creates print data 39 that includes a three-dimensional image part grayscale image for forming a three-dimensional image, and a protruding part grayscale image for forming the protruding part 82, the height of which is equal to or higher than the height of the three-dimensional image.

(3) The density of the protruding part grayscale image is equal for each portion. Thus, the height of the protruding part 82 that has been formed on the basis of the protruding part grayscale image is equal for each portion. Further, the density of the protruding part grayscale image is equal to or denser than the densest portion of the three-dimensional image part grayscale image. Thus, the height of the protruding part 82 formed on the basis of the protruding part grayscale image is equal to or higher than the height of the highest portion of the three-dimensional image. Furthermore, "height" signifies the extent of the protrusion from the front surface of the three-dimensional image forming sheet.

(4) Further, a region for a fastening hole 83 for passing a fastener 84 through the inside of the protruding part 82 is included in the protruding part grayscale image. Thus, a fastening hole 83 is formed on the inside of the protruding part 82 so as to pass through from the front surface to the back surface of the sheet.

The three-dimensional image forming sheet 17 formed on the basis of this print data 39 makes it possible to support another sheet with the protruding part 82. Thus, the three-dimensional image forming sheet 17 makes it possible to suppress instability and poor fit even when a plurality of sheets is being overlaid.

Further, the three-dimensional image forming sheet 17 makes it possible to reinforce its own strength using the protruding part 82. Thus, the three-dimensional image forming sheet 17 makes it possible to suppress waviness and curving of the sheets even when a plurality of sheets is bundled together.

Further, the three-dimensional image forming sheet 17 makes it possible to separate a three-dimensional image from another sheet using the protruding part 82 so that the three-dimensional image does not come in contact with the other sheet. Thus, it is possible to prevent the three-dimensional images from being rubbed, and thus prevent the occurrence of three-dimensional image damage, such as the color of the three-dimensional image fading, and/or the three-dimensional image peeling off.

In particular, since the fastening hole 83 is formed on the inside of the protruding part 82, when a plurality of sheets is bound into booklet form using the fasteners 84, the three-dimensional image forming sheet 17 makes it possible to reduce the likelihood of the edges on the unbound side opening widely in a fan-like manner centering around the bound portions (portions around the fasteners 84). Because this three-dimensional image forming sheet 17 makes it possible to suppress the fan-like opening and/or the curving of the sheets, the rubbing of the three-dimensional images can be prevented, thus preventing the occurrence of three-dimensional image damage, such as the color of the three-dimensional image fading, and/or the three-dimensional image peeling off.

Therefore, the three-dimensional image forming sheet 17 makes it possible to satisfactorily preserve a three-dimensional image, and to suppress the occurrence of various degradations to quality such as those mentioned above. As a result of this, the three-dimensional image forming sheet 17 can be satisfactorily (neatly so as not to wobble or become deformed) bound as the book 70A.

As described above, according to the print data creation apparatus (computer 3) according to the present embodiment, it is possible to create grayscale image print data that is suitable for preserving a three-dimensional image.

Further, according to the system for creating a three-dimensionally shaped object 1, it is possible to satisfactorily preserve a three-dimensional image.

Furthermore, the present invention is not limited to the embodiment described above, and various changes and modifications can be made without departing from the gist of the present invention.

For example, the embodiment described above has been explained in detail to facilitate understanding of the gist of the present invention. Thus, the present invention is not necessarily limited to a system that is provided with all of the components described herein. Further, the present invention makes it possible to add another component to a certain component, and/or to change some of the components to other components. Further, the present invention also makes it possible to remove some of the components.

For example, in the embodiment described above, the configuration is such that one computer 3 serves as a print data creation apparatus for creating grayscale image print data, as a print command apparatus for operating the inkjet printer 2B, and also as a unit command apparatus for operating the photoirradiation unit 4. However, a computer (not shown in the figures) that is separate from the computer 3 may be provided, and this separate computer (not shown in the figures) may function as the print data creation apparatus. In this case, it is also possible to install this separate computer (not shown in the figures) and the inkjet printer 2B in a separate location from the computer 3 and the photoirradiation unit 4.

Figure 6A:
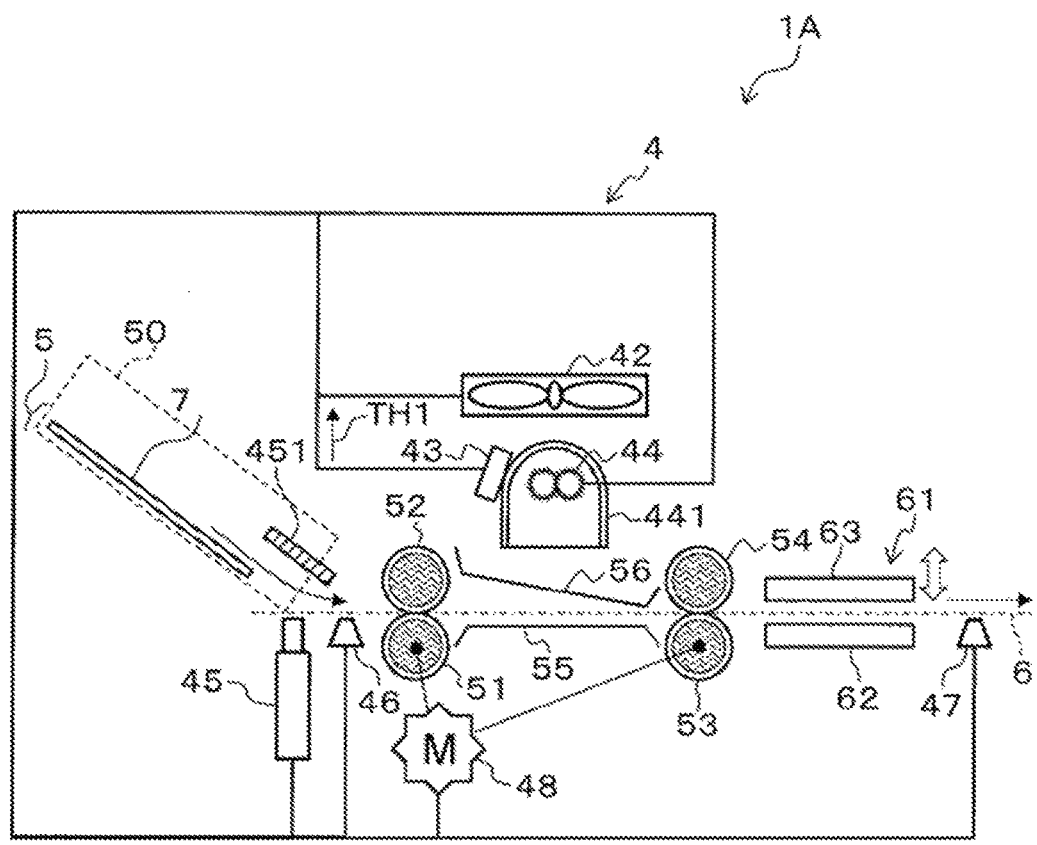
FIGS. 6A and 6B show a configuration of the system for creating a three-dimensionally shaped object according to a modification example.
Figure 6B:
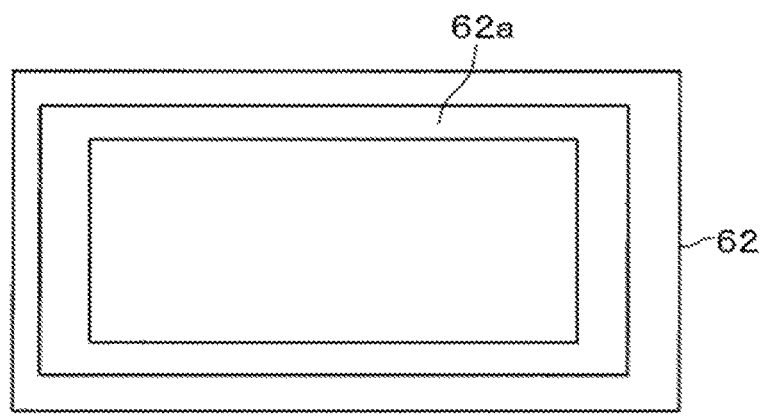

Further, the system for creating a three-dimensionally shaped object 1, for example, can be modified like the system for creating a three-dimensionally shaped object 1A shown in FIGS. 6A and 6B. FIGS. 6A and 6B show a configuration of the system for creating a three-dimensionally shaped object 1A according to a modification example. FIG. 6A shows a configuration of the photoirradiation unit 4 of the system for creating a three-dimensionally shaped object 1A, and FIG. 6B shows a shape in the overhead view of a heating unit 6, which will be described below. As shown in FIG. 6A, the system for creating a three-dimensionally shaped object 1A has a dedicated heating unit 61 for forming the protruding part 82, and so forth. The heating unit 61 is provided with a heating metal plate 62 and a pressing part 63. The heating metal plate 62 is a metal plate member for forming the protruding part 82, and so forth, on the front surface of the thermally expandable sheet 7. The pressing part 63 is a mechanism for pressing the thermally expandable sheet 7 against the heating metal plate 62. As shown in FIG. 6B, the heating metal plate 62 is provided with a heating part 62a on the surface of the side that makes contact with the thermally expandable sheet 7. The heating part 62a is an area that generates heat until the temperature is equal to or higher than the thermal expansion temperature of the thermally expandable sheet 7. The heating part 62a is the same shape as the protruding part 82, and so forth, to be formed. The system for creating a three-dimensionally shaped object 1A forms the protruding part 82, and so forth, on the front surface of the thermally expandable sheet 7 by pressing the thermally expandable sheet 7 against the heating part 62a of the heating metal plate 62 using the pressing part 63.

Further, the systems for creating a three-dimensionally shaped object 1 and 1A, for example, may create print data so that the expanded height of the protruding part 82, and so forth, is the same height as the expanded height of the point of maximum expansion of the three-dimensional image part 81.

Further, the expanded heights of the protruding parts 82, and so forth, formed on a plurality of three-dimensional image forming sheets 17 may differ for each three-dimensional image forming sheet 17, or may be the same height on all of the three-dimensional image forming sheets 17. The expanded height of the protruding part 82, and so forth, may be equal to or higher than the expanded height of the point of maximum expansion of the three-dimensional image part 81 formed on each three-dimensional image forming sheet 17.

Further, in the three-dimensional image forming sheet 17, it is not always necessary to form a fastening hole 83; the respective protruding parts 82 may be fastened together using an adhesive agent.

Furthermore, in the embodiment described above, an example is given in which the protruding part is formed continuously around the periphery of the fastening hole, but the protruding part may be formed intermittently around the fastening hole. That is, the protruding part may be formed in a shape provided with partial gaps so as to partially surround the periphery of the fastening hole.

Moreover, the plurality of three-dimensional image forming sheets 17 need not be fastened together by a fastener, but may be fastened together by glue instead. Even in such a case, forming the protruding parts 82 etc. on the area (fastening portion) fastened by the glue allows favorable binding (clean binding without slips or deformations) when a plurality of the image forming sheets 17 are overlaid and closed on one another.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A printer, comprising:
a printing unit that prints a surface-textured image on a thermally expandable sheet based on grayscale data of an image to be printed on the thermally expandable sheet, said grayscale data defining patterns and heights of protuberations to be created from thermal expansion of the thermally expandable sheet; and
a processor that creates image data for printing images on a plurality of thermally expandable sheets, the plurality of thermally expandable sheets having a prescribed fastening portion or portions at which the plurality of thermally expandable sheets is to be bound to form a booklet,
wherein, for each of the plurality of thermally expandable sheets that is to form the booklet, the processor creates grayscale image data that include the grayscale data of the image to be printed as well as additional grayscale data that create an additional protuberation or protuberations that sandwich at least some of the prescribed fastening portion or portions on the thermally expandable sheet, the processor setting a density of the additional grayscale data for the additional protuberation or protuberations to be equal to or greater than a density of a densest portion of the grayscale data of the image to be printed so that the height of the additional protuberation or protuberations is equal to or greater than a maximum height of the protuberations created by the grayscale data of the image formed on the thermally expandable sheet, and
wherein the processor outputs the created grayscale image data to the printing unit so as to print the corresponding surface-textured image and the additional protuberation or protuberations that sandwich the at least some of the prescribed fastening portion or portions on each of the thermally expandable sheets, thereby creating a buffer between overlaid thermally expandable sheets to protect the surface-textured image when bound.

2. The printer according to claim 1, wherein said additional protuberation or protuberations either intermittently or continuously surround all of the prescribed fastening portion or portions.

3. The printer according to claim 1,
wherein the prescribed fastening portion or portions are a hole or holes in the thermally expandable sheet that allows a prescribed fastener or fasteners to communicate through the thermally expandable sheet, and
wherein in creating said grayscale image data, the processor sets a printing density of the additional grayscale data that create the additional protuberation or protuberations.

4. The printer according to claim 1, wherein said grayscale image data created by the processor further includes another additional grayscale data that create another additional protuberation or protuberations at a location on the thermally expandable sheet that is different from locations at which said additional protuberation or protuberations are created.

5. The printer according to claim 4, wherein a height of said another additional protuberation or protuberations is the same as the height of said additional protuberation or protuberations.

6. A print data creation apparatus for a printing unit that prints a surface-textured image on a thermally expandable sheet based on grayscale data of an image to be printed on the thermally expandable sheet, said grayscale data defining patterns and heights of protuberations to be created from thermal expansion of the thermally expandable sheet, said print data creation apparatus comprising:
a processor configured to be connected to the printing unit, the processor creating image data for printing images on a plurality of thermally expandable sheets, the plurality of thermally expandable sheets having a prescribed fastening portion or portions at which the plurality of thermally expandable sheets is to be bound to form a booklet,
wherein, for each of the plurality of thermally expandable sheets that is to form the booklet, the processor creates grayscale image data that include the grayscale data of the image to be printed as well as additional grayscale data that create an additional protuberation or protuberations that sandwich at least some of the prescribed fastening portion or portions on the thermally expandable sheet, the processor setting a density of the additional grayscale data for the additional protuberation or protuberations to be equal to or greater than a density of a densest portion of the grayscale data of the image to be printed so that the height of the additional protuberation or protuberations is equal to or greater than a maximum height of the protuberations created by the grayscale data of the image formed on the thermally expandable sheet, and
wherein the processor is configured to output the created grayscale image data to the printing unit so as to print the corresponding surface-textured image and the additional protuberation or protuberations that sandwich the at least some of the prescribed fastening portion or portions on each of the thermally expandable sheets, thereby creating a buffer between overlaid thermally expandable sheets to protect the surface-textured image when bound.

7. The print data creation apparatus according to claim 6, wherein said additional protuberation or protuberations either intermittently or continuously surround all of the prescribed fastening portion or portions.

8. The print data creation apparatus according to claim 6,
wherein the prescribed fastening portion or portions are a hole or holes in the thermally expandable sheet that allows a prescribed fastener or fasteners to communicate through the thermally expandable sheet, and
wherein in creating said grayscale image data, the processor sets a printing density of the additional grayscale data that create the additional protuberation or protuberations.

9. The print data creation apparatus according to claim 6, wherein said grayscale image data created by the processor further includes another additional grayscale data that create another additional protuberation or protuberations at a location on the thermally expandable sheet that is different from locations at which said additional protuberation or protuberations are created.

10. The print data creation apparatus according to claim 9, wherein a height of said another additional protuberation or protuberations is the same as the height of said additional protuberation or protuberations.

11. A method of creating surface-textured images on a plurality of thermally expandable sheets that each has a prescribed fastening portion or portions at which the plurality of thermally expandable sheets is to be bound to form a booklet, using a printing unit that prints the surface-textured images on each thermally expandable sheet based on grayscale data of an image to be printed on the thermally expandable sheet, said grayscale data defining patterns and heights of protuberations to be created from thermal expansion of the thermally expandable sheet, the method comprising:
  a creation step of creating image data for printing an image on each of the plurality of thermally expandable sheets using a processor;
  a printing step of printing grayscale images on the plurality of thermally expandable sheets in accordance with the image data created in the creation step using the printing unit; and
  a protuberating step of partially protuberating the thermally expandable sheets via thermal expansion by radiating light toward the grayscale image printed on each thermally expandable sheet,
  wherein, for each of the plurality of thermally expandable sheets that is to form the booklet, the creation step creates via said processor grayscale image data that include the grayscale data of the image to be printed as well as additional grayscale data that create an additional protuberation or protuberations that sandwich at least some of the prescribed fastening portion or portions on the thermally expandable sheet, the creation step setting, via said processor, a density of the additional grayscale data for the additional protuberation or protuberations to be equal to or greater than a density of a densest portion of the grayscale data of the image to be printed so that the height of the additional protuberation or protuberations is equal to or greater than a maximum height of the protuberations created by the grayscale data of the image formed on the thermally expandable sheet, and
  wherein the printing step prints the corresponding surface-textured image and the additional protuberation or protuberations that sandwich the at least some of the prescribed fastening portion or portions on each of the thermally expandable sheets, thereby creating a buffer between overlaid thermally expandable sheets to protect the surface-textured image when bound.

12. The method according to claim 11, wherein said additional protuberation or protuberations either intermittently or continuously surround all of the prescribed fastening portion or portions.

13. The method according to claim 11,
  wherein the prescribed fastening portion or portions are a hole or holes in the thermally expandable sheet that allows a prescribed fastener or fasteners to communicate through the thermally expandable sheet, and
  wherein the creating step sets a printing density of the additional grayscale data that create the additional protuberation or protuberations.

14. The method according to claim 11,
  wherein the printing step prints the grayscale image via a thermal conversion material that converts electromagnetic energy into thermal energy and controls a quantity of the thermal conversion material on the basis of the image data.

15. A non-transitory storage medium having stored therein instructions, executable by a processor of a print data creation apparatus, the print data creation apparatus controlling a printing unit that prints a surface-textured image on a thermally expandable sheet based on grayscale data of an image to be printed on the thermally expandable sheet, said grayscale data defining patterns and heights of protuberations to be created from thermal expansion of the thermally expandable sheet, the instructions causing the processor to perform the following:
  creating image data for printing images on a plurality of thermally expandable sheets, the plurality of thermally expandable sheets having a prescribed fastening portion or portions at which the plurality of thermally expandable sheets is to be bound to form a booklet,
  wherein, for each of the plurality of thermally expandable sheets that is to form the booklet, the instructions causes the processor to create grayscale image data that include the grayscale data of the image to be printed as well as additional grayscale data that create an additional protuberation or protuberations that sandwich at least some of the prescribed fastening portion or portions on the thermally expandable sheet, the instructions causing the processor to set a density of the additional grayscale data for the additional protuberation or protuberations to be equal to or greater than a density of a densest portion of the grayscale data of the image to be printed so that the height of the additional protuberation or protuberations is equal to or greater than a maximum height of the protuberations created by the grayscale data of the image formed on the thermally expandable sheet, and
  wherein the instructions cause the processor to output the created grayscale image data to the printing unit so as to print the corresponding surface-textured image and the additional protuberation or protuberations that sandwich the at least some of the prescribed fastening portion or portions on each of the thermally expandable sheets, thereby creating a buffer between overlaid thermally expandable sheets to protect the surface-textured image when bound.

16. The non-transitory storage medium according to claim 15, wherein said additional protuberation or protuberations either intermittently or continuously surround all of the prescribed fastening portion or portions.

17. The non-transitory storage medium according to claim 15, wherein the prescribed fastening portion or portions are a hole or holes in the thermally expandable sheet that allows a prescribed fastener or fasteners to communicate through the thermally expandable sheet, and
  wherein in creating said grayscale image data, the instructions cause the processor to set a printing density of the additional grayscale data that create the additional protuberation or protuberations.

\* \* \* \* \*